US006791568B2

(12) United States Patent
Steinberg et al.

(10) Patent No.: US 6,791,568 B2
(45) Date of Patent: Sep. 14, 2004

(54) ELECTRONIC COLOR DISPLAY INSTRUMENT AND METHOD

(75) Inventors: Goodwin Steinberg, Palo Alto, CA (US); Robert A. Grimm, Los Altos, CA (US)

(73) Assignee: Steinberg-Grimm LLC, Palo Alto, CA (US)

( * ) Notice: Subject to any disclaimer, the term of this patent is extended or adjusted under 35 U.S.C. 154(b) by 92 days.

(21) Appl. No.: 10/028,809

(22) Filed: Dec. 21, 2001

(65) Prior Publication Data

US 2002/0138523 A1 Sep. 26, 2002

Related U.S. Application Data

(60) Provisional application No. 60/268,618, filed on Feb. 13, 2001.

(51) Int. Cl.[7] .......................... G09G 15/10; G09B 15/02

(52) U.S. Cl. ..................... 345/600; 84/483.2; 84/477 R

(58) Field of Search ................................ 345/597, 602, 345/600, 601; 84/477, 477 R, 600, 470 R, 483.1, 483.2

(56) References Cited

U.S. PATENT DOCUMENTS

| | | | | | |
|---|---|---|---|---|---|
| 3,969,972 | A | | 7/1976 | Bryant | |
| 5,689,078 | A | | 11/1997 | McClard | |
| 5,784,096 | A | | 7/1998 | Paist | |
| 6,008,551 | A | | 12/1999 | Coray | |
| 6,046,724 | A | | 4/2000 | Hvass | |
| 6,057,501 | A | * | 5/2000 | Hale | 84/470 R |
| 6,084,167 | A | * | 7/2000 | Akimoto et al. | 84/477 R |
| 6,127,616 | A | * | 10/2000 | Yu | 84/483.2 |
| 6,204,441 | B1 | | 3/2001 | Asahi et al. | |
| 6,271,453 | B1 | * | 8/2001 | Hacker | 84/476 |
| 6,388,181 | B2 | * | 5/2002 | Moe | 84/477 R |
| 2002/0110926 | A1 | * | 8/2002 | Kopf-Sill et al. | 436/516 |

* cited by examiner

*Primary Examiner*—Matthew C. Bella
*Assistant Examiner*—Anthony Blackman
(74) *Attorney, Agent, or Firm*—Dorsey & Whitney

(57) ABSTRACT

An electronic instrument for displaying musical notes on a monitor or screen with colors selected from a color palette created by an artist/musician for each note as selected shapes at selected locations on the monitor or screen.

10 Claims, 3 Drawing Sheets

ELECTRONIC COLOR DISPLAY INSTRUMENT AND METHOD

RELATED APPLICATIONS

This application claims priority to U.S. Provisional Application Serial No. 60/268,618 filed Feb. 13, 2001.

BRIEF DESCRIPTION OF THE INVENTION

This invention relates generally to an electronic color display instrument for providing a patterned color visual display representative of music, and more particularly to an instrument and method in which musical notes are displayed as colored shapes and patterns on a color display such as a monitor or projection on a screen.

BACKGROUND OF THE INVENTION

There is a need for an instrument with which an artist can create pleasing patterned color displays in the same manner as a musician can create music, or in which an artist can create patterned color displays to accompany music, or in which music can be rendered as a patterned color display.

SUMMARY OF THE INVENTION

In one embodiment, there is provided an electronic instrument which includes a piano-like keyboard connected to a processor through a digital interface. The keyboard is configured so that, when a key is depressed, a color code is generated. The processor receives the color code and matches the color code with coded colors in a stored color palette and generates the appropriate value of the red/green/blue to display the coded color. The processor also generates control signals to control the shape and pattern of the displayed colors. All of the processor-generated signals are then fed to a monitor or projector to display the selected colors represented by the color code as a preselected shape and color at a predetermined location to visually display a color pattern. The keyboard instrument includes a plurality of keys, each representing a different note and color selected in the palette which represents the musical scale, which can be represented by a color code which determines the color hues and values. Thus, the artist can manipulate the keys to provide a display having a selected arrangement of colored shapes. If the keyboard is a music keyboard, it can be manipulated to create music with a simultaneous patterned color display. The color can be displayed by projecting light onto a screen, wall or other object, or on a color monitor. The display can include a pattern of colors where one, two or more colors can be played and displayed at one time in different positions. In another embodiment, the electronic instrument can receive digital information representing music, convert the notes or tones to a color code and generate a color display representative of the music.

Thus, there is provided an instrument for generating a color display of musical notes or selected colors in which a processor including a stored pallette(s) representing colors is programmed to receive digital information representing stored colors or musical notes and generating and transferring color signals representing the color(s) selected from the stored color pallette to a color display responsive to said color signals to display said musical notes as selected colored shapes at different locations.

BRIEF DESCRIPTION OF THE DRAWINGS

The invention will be more clearly understood from the following description when read in conjunction with the accompanying drawings in which.

DETAILED DESCRIPTION OF THE INVENTION

Figure 1:
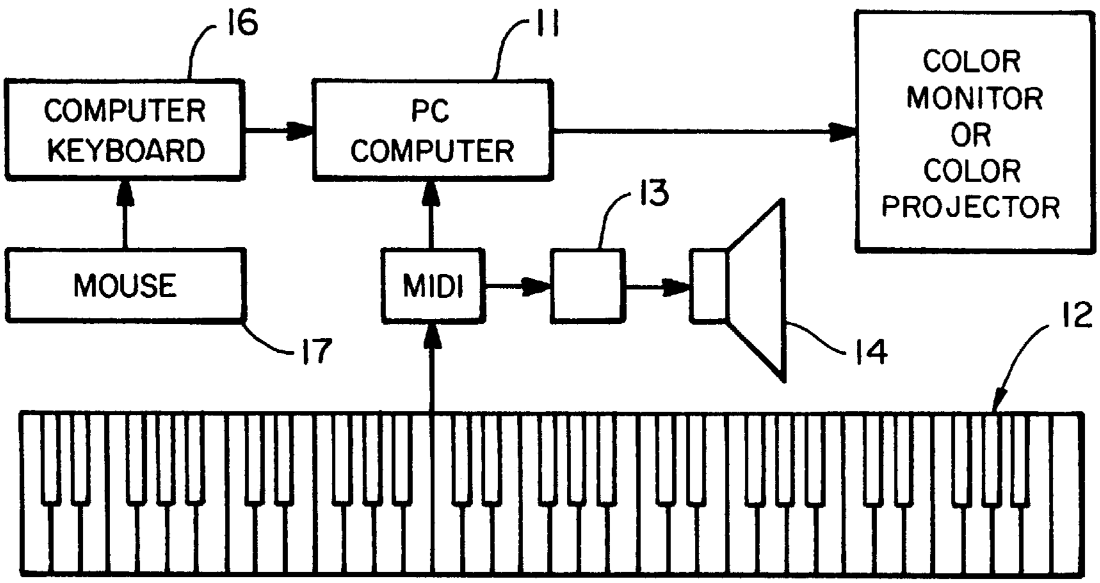
FIG. 1 is a block diagram of a color display instrument employing a personal computer and a piano keyboard.
Figure 5:
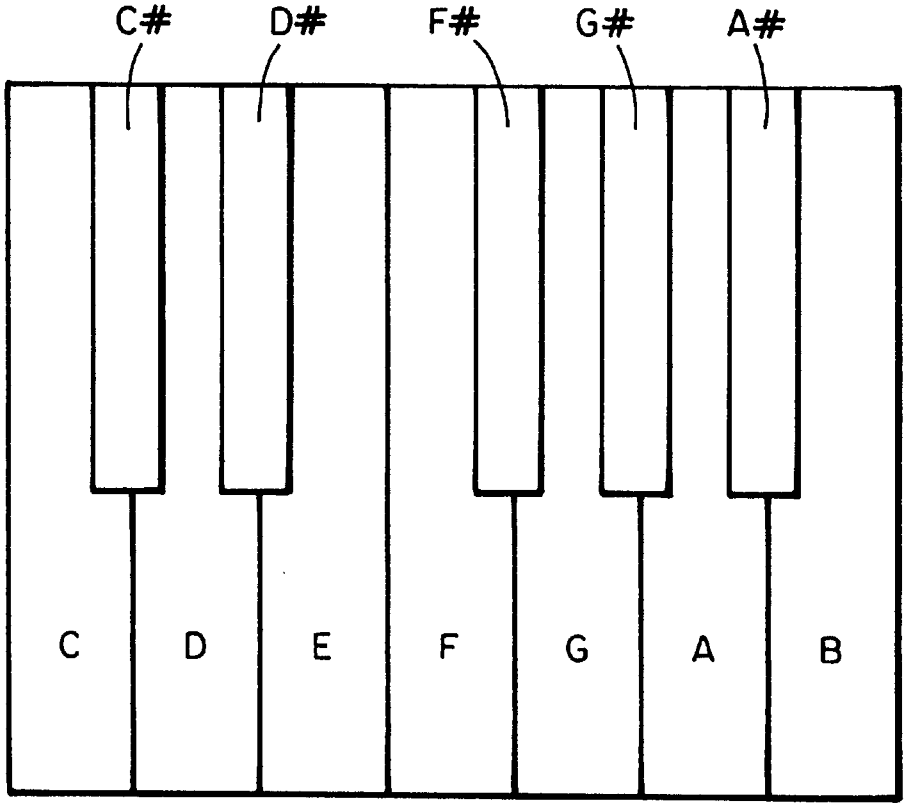
FIG. 5 shows one octave of the piano-like keyboard of FIG. 1.

Referring to FIG. 1, the color instrument includes a personal computer or processor 11 which is programmed to receive digital color codes from a piano-like keyboard 12. One octave of the piano keyboard is illustrated in FIG. 5. Depression of a key gives an output digital color code indicative of the key. The digital code not only includes information representing the key, but also includes information regarding duration, intensity, velocity, etc. of its depression. One such digital coding system can, for example, be the coding system known as the musical instrument digital interface (MIDI). Where the keyboard is used to play music, the digital signals are also processed by a sound circuit 13 which drives one or more speakers 14.

In accordance with the present invention, the computer which receives the digital signals includes a stored color lookup table or palette. The table includes a coded color for each of the keys or tones represented by the keys. The color palette can be created by the musician/artist. The code can, for example, be the Munsell color code, which gives the proper ratio of the primary colors (red, blue and green) for the generation of each color representing a key or note. A color instrument note chart is shown in Table 1. The first column represents the MIDI note number, the second column the respective musical note, the third column the particular color selected by the artist for a given note, the fourth column the corresponding Munsell color code and the fifth, sixth and seventh columns the RGB color format for a color monitor. The conversion from Munsell color code to RGB is available at gretagmacbeth.com. The piano keyboard includes a plurality of octaves, each of which includes twelve notes. Referring, for example, to FIG. 1, the key 16 represents the middle C, MIDI note 60. Referring to FIG. 5, the twelve notes of an octave are shown. The keyboard includes octaves above and below the octave which includes middle C. As an example, the digital code (note) for middle C may be represented by the pure color red, the other digital codes (notes) can be represented by a pure color palette as follows: C#=red/purple, D=purple, D#=blue/purple, E=blue, F=green/blue, F#=green, G=yellow/green, G#=yellow, A=yellow/orange, A#=orange and B=red/orange. The sequence of colors repeats for each octave (twelve colors). The middle group including middle C are the pure colors with the value changing to more white or more black as one moves up and down the keyboard. The colors in the palette are digitally labeled. Thus, depression of a key such as that labeled middle C will cause the computer to go to the lookup table and select the correct color. The colors are each coded to provide the proper intensity of red, blue and green for each pixel to generate the color on the color display (monitor or projector). The value of the hue will vary depending on the octave in which the key is located. It is apparent that other keyboard configurations may be adopted as well as other color palettes. The digital input may also be from other digital sources or be derived by digitizing signals from other sound sources.

TABLE 1

| MIDI* | | | MUNSELL** | | RGB FORMAT | | |
|---|---|---|---|---|---|---|---|
| NOTE NO. | NOTE | COLOR | NOTATION | | RED | GREEN | BLUE |
| 89 | F | Green Blue | 10BG 7/6 | | 115 | 197 | 203 |
| 88 | E | Blue | 10B 7/8 | | 118 | 193 | 234 |
| 87 | D# | Blue Purple | 10PB 7/6 | | 184 | 181 | 222 |
| 86 | D | Purple | 10P 7/8 | | 223 | 169 | 209 |
| 85 | C# | Red Purple | 10RP 7/8 | | 242 | 164 | 173 |
| 84 | C | Red | 10R7/10 | M | | | |
| 83 | B | Red Orange | 2.5YR 7/8 | o | 243 | 146 | 99 |
| 82 | A# | Orange | 7.5YR 8/8 | r | 255 | 173 | 101 |
| 81 | A | Yellow Orange | 5Y 8.5/6 | e | 243 | 193 | 113 |
| 80 | G# | Yellow | 5GY 8/6 | | 202 | 189 | 110 |
| 79 | G | Yellow Green | 2.5G 6/8 | W | 91 | 153 | 97 |
| 78 | F# | Green | 10G 6/8 | h | 53 | 154 | 119 |
| 77 | F | Green Blue | 10BG 6/8 | i | 0 | 152 | 147 |
| 76 | E | Blue | 10B 6/10 | t | 46 | 147 | 175 |
| 75 | D# | Blue Purple | 10PB 6/8 | e | 160 | 134 | 164 |
| 74 | D | Purple | 10P 6/10 | | 206 | 121 | 151 |
| 73 | C# | Red Purple | 10RP6/10 | | 227 | 116 | 116 |
| 72 | C | Red | 10R 6/12 | | 240 | 113 | 65 |
| 71 | B | Red Orange | 2.5YR 7/10 | | 254 | 142 | 89 |
| 70 | A# | Orange | 7.5Y 7/12 | | 204 | 163 | 0 |
| 69 | A | Yellow Orange | 5Y 5/10 | | 161 | 116 | 0 |
| 68 | G# | Yellow | 5GY 7/12 | | 165 | 171 | 0 |
| 67 | G | Yellow Green | 2.5G 5/12 | | 0 | 135 | 62 |
| 66 | F# | Green | 10G 6/10 | | 0 | 156 | 118 |
| 65 | F | Green Blue | 10BG 5/8 | | 0 | 130 | 129 |
| 64 | E | Blue | 5B 5/10 | P | 0 | 149 | 189 |
| 63 | D# | Blue Purple | 10PB 5/10 | u | 137 | 110 | 154 |
| 62 | D | Purple | 10P 5/12 | r | 189 | 93 | 137 |
| 61 | C# | Red Purple | 10RP 5/12 | e | 213 | 84 | 96 |
| 60 | Middle C | Red | 10R 5/16 | | 227 | 90 | 0 |
| 59 | B | Red Orange | 2.5YR 5/12 | C | 205 | 95 | 26 |
| 58 | A# | Orange | 7.5YR 6/14 | o | 220 | 125 | 0 |
| 57 | A | Yellow Orange | 5Y 8/14 | l | 244 | 181 | 0 |
| 56 | G# | Yellow | 5GY 7/8 | o | 173 | 169 | 74 |
| 55 | G | Yellow Green | 2.5G 5/8 | r | 67 | 130 | 77 |
| 54 | F# | Green | 10G 4/8 | | 0 | 109 | 83 |
| 53 | F | Green Blue | 10BG 4/6 | | 0 | 105 | 105 |
| 52 | E | Blue | 10B 4/10 | | 0 | 103 | 136 |
| 51 | D# | Blue Purple | 10PB 4/10 | | 114 | 88 | 134 |
| 50 | D | Purple | 10P 4/12 | | 162 | 70 | 119 |
| 49 | C# | Red Purple | 10RP 4/10 | | 174 | 69 | 80 |
| 48 | C | Red | 10R 5/12 | | 212 | 90 | 44 |
| 47 | B | Red Orange | 2.5YR 4/10 | | 170 | 76 | 30 |
| 46 | A# | Orange | 7.5YR 5/10 | M | 183 | 107 | 0 |
| 45 | A | Yellow Orange | 5Y 7/12 | o | 216 | 159 | 0 |
| 44 | G# | Yellow | 5GY 5/8 | r | 121 | 125 | 33 |
| 43 | G | Yellow Green | 2.5G 4/6 | e | 62 | 106 | 66 |
| 42 | F# | Green | 10G 3/6 | | 0 | 85 | 66 |
| 41 | F | Green Blue | 10BG 3/6 | b | 0 | 84 | 86 |
| 40 | E | Blue | 10B 3/8 | l | 0 | 81 | 109 |
| 39 | D# | Blue Purple | 10PB 3/10 | a | 93 | 65 | 116 |
| 38 | D | Purple | 10P 3/10 | c | 130 | 52 | 97 |
| 37 | C# | Red Purple | 10RP 3/8 | k | 139 | 52 | 64 |
| 36 | C | Red | 10R 3/10 | | 148 | 48 | 26 |
| 35 | B | Red Orange | 2.5YR 3/8 | | 135 | 59 | 27 |
| 34 | A# | Orange | 7.5YR 4/6 | | 144 | 89 | 43 |
| 33 | A | Yellow Orange | 5Y 5/8 | | 159 | 116 | 14 |
| 32 | G# | Yellow | 5G 4/6 | | 48 | 106 | 75 |
| 31 | G | Yellow Green | 2.5G 3/4 | | 59 | 82 | 58 |
| 30 | F# | Green | 10G 3/4 | | 47 | 82 | 67 |

*MIDI: Musical Instrument Digital Interface
**Munsell color code: 10R 3/10 means: Hue 10R; value 3; chroma 10.

The computer responds to the selected color by retrieving from the lookup table the color code (red, blue and green) and sending color control signals to the monitor electronics to display the appropriate pixels for the selected color. The computer can be programmed to show the entire screen in the selected color. Alternatively, the computer may be programmed to light only a portion of the screen as each key is depressed to give a multicolor display. The computer can also be programmed to provide designs whose colors are controlled through the computer keyboard and mouse 16 and 17. Shapes and geometric forms and abstracts of realistic representations of organic, natural and inanimate objects can be displayed using programmed selected color combinations. Examples of shapes are polygons, circles, starbursts, clouds, bubbles, etc. Waves of color similar to waves generated by casting pebbles into a pond can be displayed. The computer can be programmed so that the musician/artist can select the color and pattern of the background. The background may either remain static or undergo change in texture, pattern and color as a song is performed. The musician/artist could select a background that is a specific color, a colored gradient, an abstract pattern or one that is representational, such as a still image or a video clip.

Figure 3:
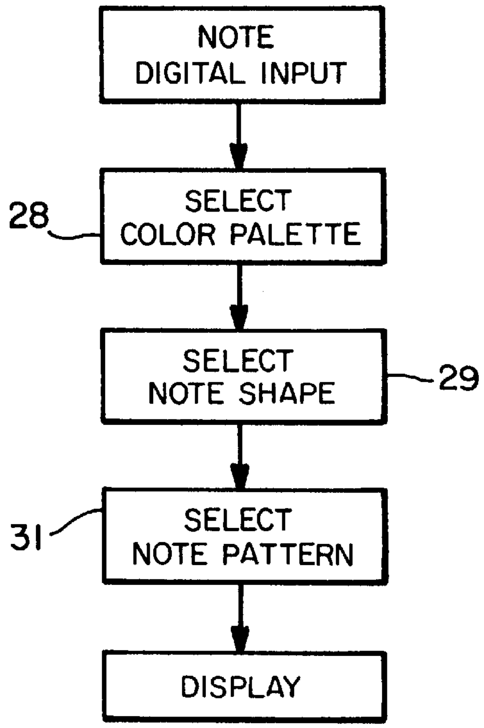
FIG. 3 is a flow chart illustrating the operation of the invention.
Figure 4A:
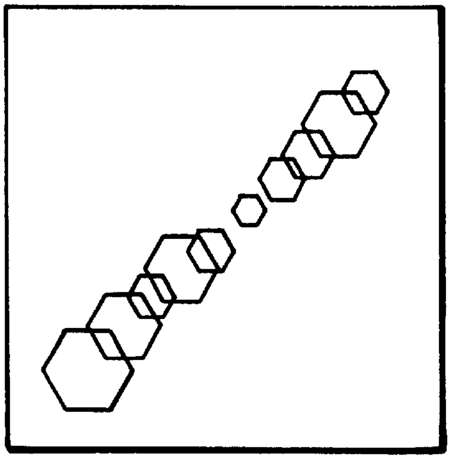
FIGS. 4A–4C are schematic illustrations of some note color shapes and patterns.
Figure 4B:
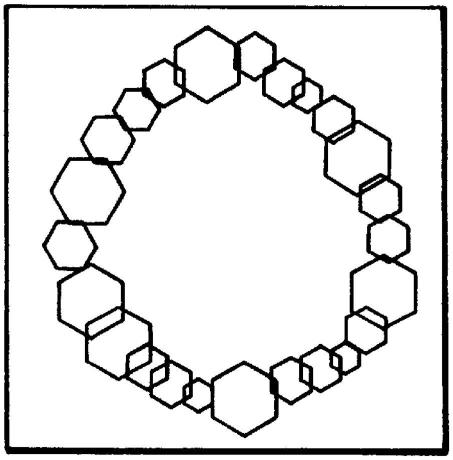
Figure 4C:
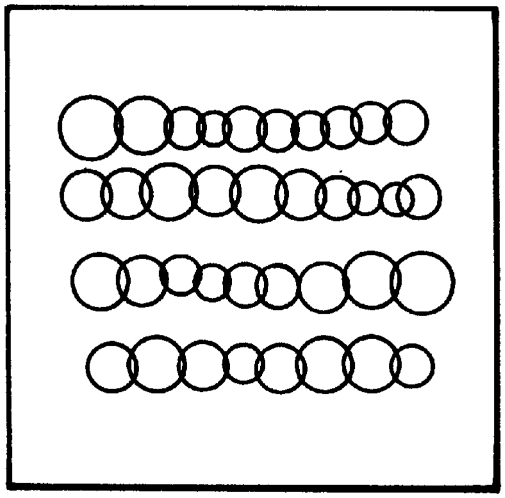

FIG. 3 illustrates the use of the mouse 16 and keyboard 17 by the musician/artist to select the color palette 28, stored in the computer, the shape or configuration of the note 29 and the pattern 31. For example, each note may be represented by a shape such as a hexagon, FIGS. 4A and 4B, or a circle, FIG. 4C. The position of the note varies with the notes. For example, the position may be along a straight line, FIG. 4A, circle, FIG. 4B, or parallel lines, FIG. 4C, or the processor may be programmed to give any desired shape and pattern as described above. The size of the shape and brightness can vary with the intensity of the sound. The computer may be programmed to provide other desired visual effects. The programmed computer can include design templates which are selected by the musician/artist. The templates can identify the position of the notes and create a sense of movement as the color notes are played. In addition to the examples of FIGS. 4A–4E, the template can include zig-zag, spiral, unshaped, etc., in which the color shapes are arranged.

It is also apparent that the keyboard can be of other configurations, and that the colors need not repeat every set of twelve colors as indicated above. The sets of colors can be any number of colors which will give the desired color display for a particular purpose. Rather than a computer monitor the display can be a film or television screen, or an image projected on a screen, wall or the like by color projectors controlled by the computer.

Figure 2:
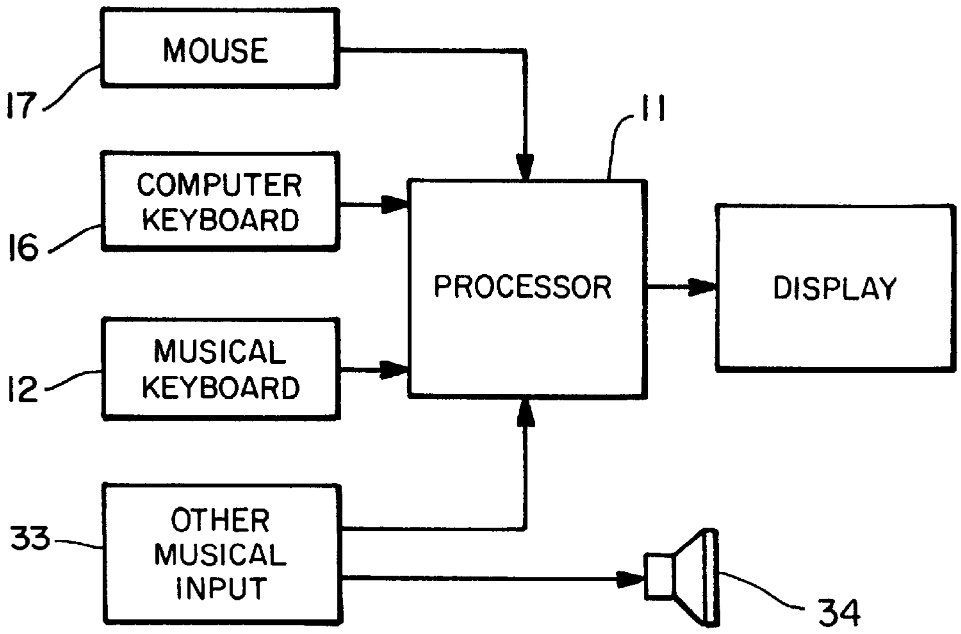
FIG. 2 is a block diagram of another embodiment of a color display instrument.

One contemplated use of the instrument is to synchronize a color display with existing music and musicals. Referring to FIG. 2, a record player, compact disc player, other musical instrument or other instrument, provides musical input 33 which can either be digital or digitized and applied to the computer which is programmed and controlled by the musician/artist to provide synchronized color with the music emanating from speakers 34. The instrument also allows an artist/musician to play with light as a musician does with sound to create artistic displays. The program of color sequences created by the artist can be recorded for later playback. A musician/artist can play music on the piano or other instrument and generate the digital representation of the tones or notes and also use a computer keyboard to generate control signals, all of which are applied to the computer to provide a visual color display.

It is apparent that the keyboard and computer can be programmed to control amplitude or brightness of the colors. It is also possible to have features such as a vibrato in which the color wavers about a central color. If two or more color keys are depressed simultaneously, the colors could be mixed visually by alternating rapidly between the colors such that the viewer's eye combines the colors. Alternatively, the colors could be alternately displayed in adjacent small areas such that the viewer's eye combines the images of intermixed color dots. Incorporation of a computer/processor in the color instrument enables the creation of many specialized effects. For example, the musical characteristics of a note, such as pitch, timbre, volume, attack and decay can be seen as well as heard. The musician/artist can specify and program the computer to convert audible notes into visual color notes in which pitch is assigned patterns or colors, the shapes can be an interpretation of timbre. A piano note may be represented by a series of rings, whereas a note from a guitar might be represented by a vibrating polygon. Attack might be represented by an expanding shape and decay by a fading note.

In summary, there has been provided a color display instrument which is responsive to a digital input color code to provide a color display. More particularly, the instrument includes a processor programmed and configured so that when a particular digital color code is applied, it selects a color from a color palette and determines the appropriate values of the red/green/blue and other control signals to be fed to the monitor or color projector to produce a color display.

What is claimed is:

1. An electronic color display instrument for generating a color display of musical notes comprising a processor configured to store at least one palette representing a selected color for each note in a range of musical notes in a musical scale with related notes in higher and lower scales represented by different shades of the same color, each color identified by a digital label and represented by a color signal, said palette connected to receive digital signals representing selected musical notes and look up the color signal by matching the digital signals to the digital labels and generate color signals representing the selected musical notes and a color display for receiving the color signals to display the selected colors for each note.

2. An electronic color display instrument as in claim 1 in which the processor is further configured to store selected display shapes whereby the selected colors can be displayed as selected shapes.

3. An electronic color display instrument as in claim 2 in which the processor is further configured to store selected display locations whereby the selected colors and shapes can be displayed at selected locations.

4. An electronic color display instrument as in claim 2 or 3 in which the processor is further configured to store selected background whereby selected shapes can be displayed with selected backgrounds.

5. An electronic color display instrument as in claim 1, 2 or 3 in which the musical scale is a twelve note octave.

6. An electronic color display instrument as in claim 1, 2 or 3 in which the digital signals representing musical note are generated by a piano-like keyboard.

7. An electronic color display instrument as in claim 1, 2 or 3 in which the digital signals representing musical notes is generated by music.

8. An electronic color display instrument as in claim 2 or 3 in which the digital information is generated by an artist/musician playing a keyboard and shapes and location are entered by the artist/musician through a processor keyboard.

9. An electronic color display instrument for generating a color display of musical notes comprising a processor configured to store at least one palette representing a selected color for each note in a range of musical notes in a musical scale with related notes in higher and lower scales represented by different shades of the same color, each color identified by a digital label and represented by a color signal, and palettes of display shapes and locations, said processor configured to receive digital signals representing musical notes and look up the color signals by matching the digital signals to the digital labels and generate and color signals representing the selected musical notes, said processor also configured to receive signals representing shapes and their location, and a color display to display said selected colors as selected shapes at selected locations.

10. An electronic color display instrument in claim 2, 3 or 9 in which the processor is further configured to vary the size of the shapes and brightness with intensity of the note.

* * * * *